(12) United States Patent
He et al.

(10) Patent No.: US 11,300,527 B1
(45) Date of Patent: Apr. 12, 2022

(54) METHOD FOR DETECTING LENS CLEANLINESS USING SPECTRAL DIFFERENTIAL FLAT FIELD CORRECTION

(71) Applicant: MLOptic Corp, Redmond, WA (US)

(72) Inventors: Jiang He, Hangzhou (CN); Teresa Zhang, Albany, NY (US); Wei Zhou, Sammamish, WA (US); Peihong Bai, Nanjing (CN)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 17/485,240

(22) Filed: Sep. 24, 2021

(30) Foreign Application Priority Data

Sep. 27, 2020 (CN) .......................... 202011030015.4

(51) Int. Cl.
| | | |
|---|---|---|
| *G01N 21/958* | (2006.01) | |
| *G01M 11/02* | (2006.01) | |
| *G06T 5/50* | (2006.01) | |
| *H04N 5/225* | (2006.01) | |
| *G01N 21/88* | (2006.01) | |

(52) U.S. Cl.
CPC ....... *G01N 21/958* (2013.01); *G01M 11/0257* (2013.01); *G06T 5/50* (2013.01); *H04N 5/2256* (2013.01); *G01N 2021/8825* (2013.01); *G01N 2021/9583* (2013.01); *G06T 2207/30108* (2013.01)

(58) Field of Classification Search
CPC ......... G01N 21/958; G01N 2021/8825; G01N 2021/9583; G01M 11/0257; G06T 5/50; G06T 2207/30108; H04N 5/2256
See application file for complete search history.

(56) References Cited

U.S. PATENT DOCUMENTS

2010/0110418 A1* 5/2010 Shapirov .............. G01N 21/956
356/237.1

* cited by examiner

*Primary Examiner* — Shawn Decenzo
*Assistant Examiner* — Amanda Merlino
(74) *Attorney, Agent, or Firm* — Tracy Jong Law Firm; Tracy P. Jong; Cheng Ning Jong

(57) ABSTRACT

A method for detecting lens cleanliness of a lens disposed in a flat-field optical path, the flat-field optical path including a light source, the lens, a camera, the light source is a narrow-band multispectral uniform surface light source, the camera's light-sensitive surface is disposed perpendicular to an optical axis of the lens and in the light position of the lens, the method including collecting the bright-field image data and dark-field image data in a plurality of spectra through the lens; for each pixel, performing a spectral differential flat-field correction operation to yield a plurality of spectral differentials; and displaying the spectral differentials in the form of a plurality of images to show a uniformity of each of the plurality of images, wherein a non-uniform area on each of the plurality of images is determined to have been caused by an impurity of the lens.

4 Claims, 3 Drawing Sheets

| | Spectroscopy A1 | Spectroscopy A2 | Spectroscopy A3 | Spectroscopy A4 | ... | Spectroscopy AN |
|---|---|---|---|---|---|---|
| Spectroscopy A1 | Empty | A1A2 Differential | A1A3 Differential | A1A4 Differential | ... | A1AN Differential |
| Spectroscopy A2 | A2A1 Differential | Empty | A2A3 Differential | A2A4 Differential | ... | A2AN Differential |
| Spectroscopy A3 | A3A1 Differential | A3A2 Differential | Empty | A3A4 Differential | ... | A3AN Differential |
| Spectroscopy A4 | A4A1 Differential | A4A2 Differential | A4A3 Differential | Empty | ... | A4AN Differential |
| ... | ... | ... | ... | ... | Empty | ... |
| Spectroscopy AN | ANA1 Differential | ANA2 Differential | ANA3 Differential | ANA4 Differential | ... | Empty |

FIG. 3

METHOD FOR DETECTING LENS CLEANLINESS USING SPECTRAL DIFFERENTIAL FLAT FIELD CORRECTION

PRIORITY CLAIM AND RELATED APPLICATIONS

This non-provisional application claims the benefit of priority from Chinese Pat. App. No. 2020110300154 filed on Sep. 27, 2020. Said application is incorporated by reference in its entirety.

BACKGROUND OF THE INVENTION

1. The Field of the Invention

The present invention relates to a lens inspection method. More specifically, the present invention is directed to a method for detecting lens cleanliness using spectral differential flat field correction.

2. Background Art

Cleanliness is an important indicator of an imaging system and cleanliness is directly related to stray light, ghosting, uniformity and other key imaging factors. In a lens manufacturing process, the generation of surface defects is often unavoidable. In general, surface defects are local physical or chemical properties of product surface uneven areas, such as inclusions, damage, stains, etc., all having adverse impacts on the cleanliness of the product. Therefore, a lens manufacturer attaches great importance to lens cleanliness inspection, through timely discovery of surface defects of the lens, effective control of product quality, further analysis and solution of problems in the production process, thereby eliminating or reducing the generation of defective products.

Finished lens are predominantly visually inspected. Such method of inspection yields a low sampling rate and accuracy, is real-time poor, inefficient and labor-intensive. These shortcomings are further exacerbated by inspectors' work experience and skills while machine vision-based inspection methods can largely overcome the shortcomings.

Machine vision can be utilized in non-contact and non-destructive automatic inspections, therefore making it an effective means to achieve equipment automation, intelligence and precision control, with advantages in safety, reliability, wide spectral response ranges, reduction of long working hours in harsh environments and high productivity. Machine vision includes an image analysis module, a data management module and a human-machine interface module. An image acquisition module can include a charge-coupled device (CCD) camera, an optical lens, a light source and its clamping device, etc. Its function is to complete the acquisition of images of a product surface. Under the illumination of a light source, a surface of a product is imaged on the camera sensor through an optical lens and the light signal obtained of the surface of the product is converted into an electrical signal, which is then converted into a digital signal that can be processed by a computer. Currently, industrial cameras are mainly based on CCD or complementary metal oxide semiconductor (CMOS) chip technology. CCD is currently the most commonly used image sensor for machine vision. A light source directly affects image quality and its role is to overcome ambient light interference, to ensure image stability and result in images with the highest possible contrast. Currently used light sources are halogen lamps, fluorescent lamps and light-emitting diode (LED). An LED light source is beneficial as it comes in a small form factor, is low in power consumption, is fast in response time, is a good light-emitting monochrome, is highly reliable, is a uniform and stable light, is easy to integrate and is applicable to a wide range of applications.

Illumination systems composed of light sources can be divided into bright-field and dark-field illumination, structured light illumination and stroboscopic illumination according to their illumination methods. Since the bright-field signal itself carries information about the relative illuminance of the large-angle field of view, it can have a non-negligible effect on imaging. However, the manner in which the influence of a low relative illuminance of a large-angle field of view is suppressed, the manner in which the observable range of the impurity to be detected is amplified and the manner in which the detection efficiency of impurity is effectively improved, are the emphases of current researches in the field of lens inspection.

SUMMARY OF THE INVENTION

In accordance with the present invention, there is provided a method for detecting lens cleanliness of a lens disposed in a flat-field optical path, the flat-field optical path including a light source, the lens, a camera, the light source is a narrow-band multispectral uniform surface light source, the camera's light-sensitive surface is disposed perpendicular to an optical axis of the lens and in the light position of the lens, the method including:
  (a) collecting the bright-field image data and dark-field image data in a plurality of spectra through the lens;
  (b) for each pixel, performing a spectral differential flat-field correction operation to yield a plurality of spectral differentials, wherein said plurality of spectral differentials comprise AiAj spectral differential=(bright-field image data for an Ai spectrum—dark-field image data for the Ai spectrum)/(bright-field image data for an Aj spectrum—dark-field image data for the Aj spectrum), Ai and Aj are two different spectra, i is an index ranging from 1 to N, j is an index ranging from 1 to N and N is the number of spectra; and
  (c) displaying the spectral differentials in the form of a plurality of images to show uniformity of each of the plurality of images, wherein a non-uniform area on each of the plurality of images is determined to have been caused by an impurity of the lens.

In one embodiment, the plurality of spectra include R, G and B. In one embodiment, the narrow-band multispectral uniform surface light source includes an RGB trichromatic narrow band uniform surface light source, wherein the plurality of images includes six images including:
  (a) RG spectral differential=(R spectral bright-field image data–R spectral dark-field image data)/(G spectral bright-field image data–G spectral dark-field image data);
  (b) GR spectral differential=(G spectral bright-field image data–G spectral dark-field image data)/(R spectral bright-field image data–R spectral dark-field image data);
  (c) RB spectral differential=(R spectral bright-field image data–R spectral dark-field image data)/(B spectral bright-field image data–B spectral dark-field image data);

(d) BR spectral differential=(B spectral bright-field image data−B spectral dark-field image data)/(R spectral bright-field image data−R spectral dark-field image data);

(e) BG spectral differential=(B spectral bright-field image data−B spectral dark-field image data)/(G spectral bright-field image data−G spectral dark-field image data); and (f) GB spectral differential=(G spectral bright-field image data−G spectral dark-field image data)/(B spectral bright-field image data−B spectral dark-field image data).

In one embodiment, the collecting step includes measuring the dark-field image data under each of the plurality of spectra individually and obtaining the bright-field image data and dark-field image data for each pixel under each of the plurality of spectra.

An object of the present invention is to provide a method for detecting lens cleanliness using spectral differential flat field correction in order to effectively improve the efficiency of impurity detection.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 depicts a combinatorial arrangement of spectral differential flat-field correction.

PARTS LIST

Figure 1:
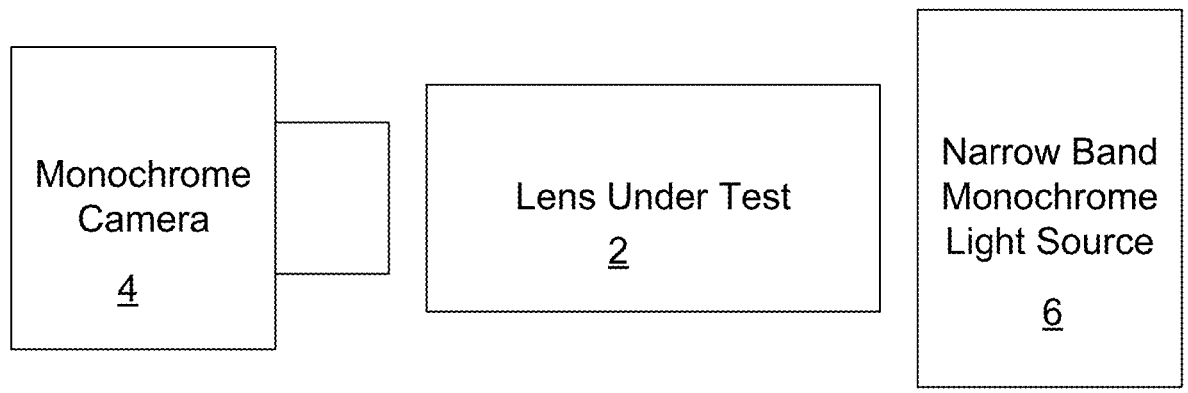
FIG. 1 depicts a spectral differential flat-field correction test system.
Figure 2:
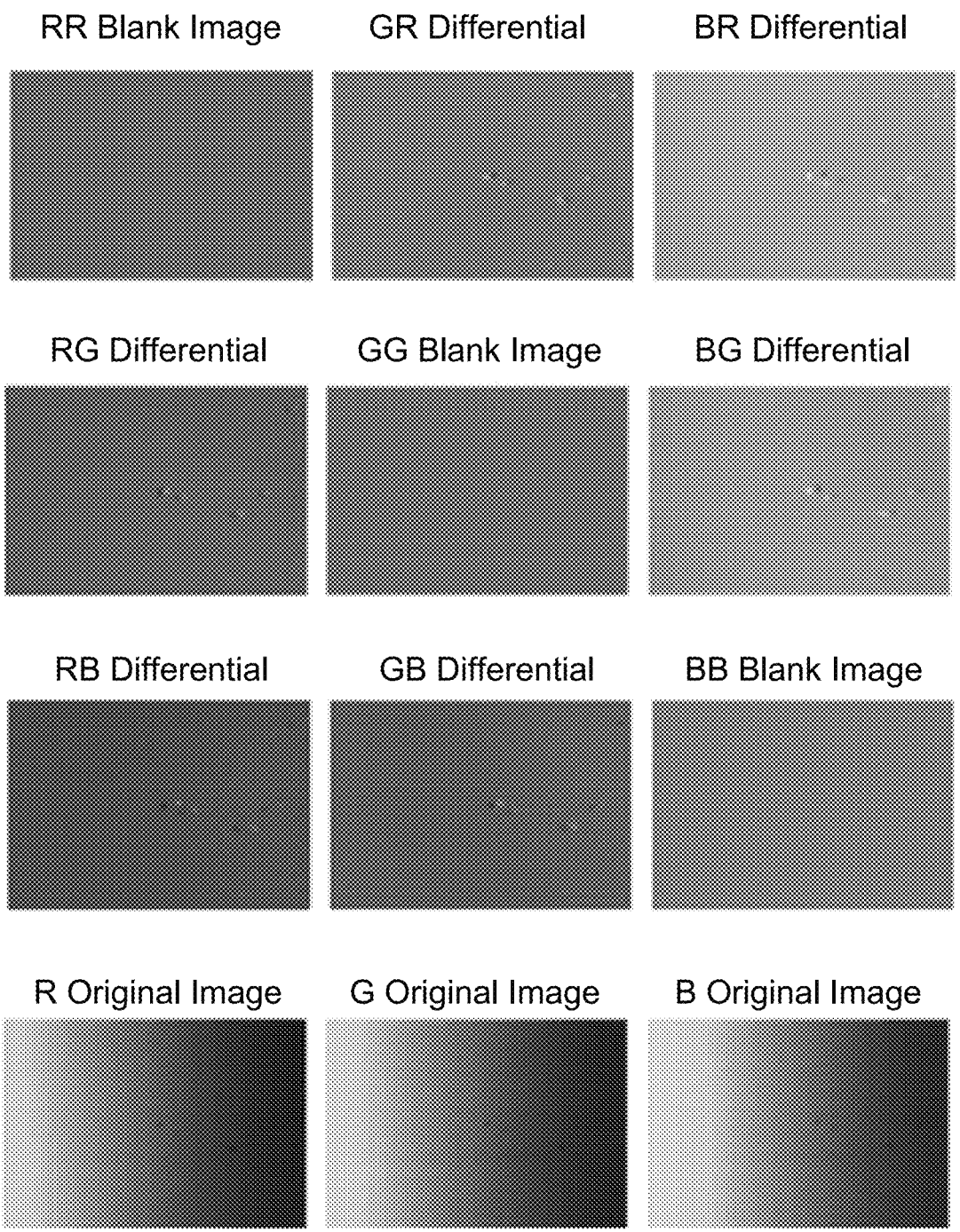
FIG. 2 depicts an image of the differential flat-field correction results of the RGB trichromatic spectrum.

2—lens
4—camera
6—light source

DETAILED DESCRIPTION OF A PREFERRED EMBODIMENT

There is provided a method for detecting lens cleanliness using spectral differential flat field correction. The method includes building a flat-field test optical path, selecting a plurality of spectra and measuring bright-field image data and dark-field image data in different spectra and performing a spectral differential flat-field correction operation on each pixel. The spectrum of the flat-field test optical path is configured to be adjustable. The flat-field test optical path includes a light source, the lens under test and a monochrome camera. The monochrome camera's light-sensitive surface is placed perpendicular to the optical axis of the lens under test and panned to the light position of the lens under test. Bright-field image data is defined as the data obtained when the brightest value at the center of the field of view is 80% to 90% of the saturation value. Dark-field image data is defined as the data obtained when there is no signal input. The camera exposure time is fixed and the brightness of the light source is adjustable. The bright-field image data and dark-field image data are collected for each pixel under each spectrum. Subsequently, for each pixel, a spectral differential flat-field correction operation is performed where AiAj spectral differential=(bright-field image data for an Ai spectrum—dark-field image data for the Ai spectrum)/(bright-field image data for an Aj spectrum—dark-field image data for the Aj spectrum), Ai and Aj are two different spectra, i is an index ranging from 1 to N, j is an index ranging from 1 to N and N is the number of spectra. The spectral differential flat-field correction operation traverses spectrum A1, spectrum A2, spectrum A3, . . . spectrum AN−1, and spectrum AN. N×(N−1) combinations of spectral differentials are obtained.

Preferably, the light source is selected as an RGB trichromatic narrow band uniform surface light source and the following flat-field correction operation is performed on the bright-field image data and dark-field image data of each pixel in the RGB trichromatic spectrum.

$RG$ spectral differential=($R$ spectral bright-field image data−$R$ spectral dark-field image data)/($G$ spectral bright-field image data−$G$ spectral dark-field image data).

$GR$ spectral differential=($G$ spectral bright-field image data−$G$ spectral dark-field image data)/($R$ spectral bright-field image data−$R$ spectral dark-field image data).

$RB$ spectral differential=($R$ spectral bright-field image data−$R$ spectral dark-field image data)/($B$ spectral bright-field image data−$B$ spectral dark-field image data).

$BR$ spectral differential=($B$ spectral bright-field image data−$B$ spectral dark-field image data)/($R$ spectral bright-field image data−$R$ spectral dark-field image data).

$BG$ spectral differential=($B$ spectral bright-field image data−$B$ spectral dark-field image data)/($G$ spectral bright-field image data−$G$ spectral dark-field image data).

$GB$ spectral differential=($G$ spectral bright-field image data−$G$ spectral dark-field image data)/($B$ spectral bright-field image data−$B$ spectral dark-field image data).

The six spectral differentials are displayed in the form of six images for the determination of the lens cleanliness.

Compared to existing technology, the invention has the following significant effects: As the plurality of spectra of the narrow-band surface light source were measured independently and the image data obtained of the plurality of spectra can suppress the influence of large-angle field of view low relative illumination. The signal-to-noise ratio of the large field of view range is improved. Edge enhancement of impurity imaging is obtained. The observable range of the impurity to be detected is enlarged. After offsetting an impurity relative to the optical center into symmetrical distributions with differential impurity imaging, observable patterns of the impurity are then unified. As the smallest resolvable size is the detector pixel size, the spectral sensitivity of the impurity itself can be effectively used.

The following is a detailed description of the technical scheme of the present invention, taking the RGB trichromatic spectrum as an example, together with the accompanying drawings. There is provided a method for detecting the cleanliness of a lens using spectral differential flat field correction, the method including:

(a) providing a flat-field test light path, the light path including a homogeneous area light source with a narrow band of the multicolor spectrum, a lens to be tested and a monochrome camera that meets the resolution requirements. Camera pixel size is the main factor that affects the accuracy of detecting contaminant size. Camera resolution is the main factor that affects the detection range. It is necessary to determine the monochrome camera that meets the resolution requirement according to the detection accuracy. In this example, the narrow-band uniform surface light source uses an 8-inch multi-LED integrating sphere, the multi-LED integrating sphere including RGB tricolor LEDs with center wavelengths at 641 nm, 520 nm, 457 nm, and half-peak widths of 20 nm, respectively. The RGB tricolor LEDs can be lit independently. The lens is mounted onto a V-block tool. The lens is disposed at a large field of view, e.g., 120*120 degrees view angle. The camera is disposed in a manner where the camera's light-sensitive surface is perpendicular to the optical axis of the lens and the camera is translated to a position to detect light through the lens. In this example, the camera uses a pixel size of 5.5 um and a pixel count of 8000*6000, placed at the rear focal plane of the lens;

(b) selecting a spectrum and measuring the bright-field image data and dark-field image data required for flat-field correction. The bright-field image data is the data obtained when the brightest value at the center of the field of view is 80% to 90% of the saturation value and the dark-field image data is the data collected when there is no signal input. The measuring step is performed with the exposure time fixed, the brightness of the light source adjusted so that the camera output falls within its range. The image data can then be collected. Different spectral dark-field image data is collected separately to improve data accuracy. In this example, the camera exposure time is fixed at 50 ms, the integrating sphere is adjusted to output 641 nm monochrome R light and the output is adjusted to 0 Nits, i.e., no light output and the camera acquires images as dark-field image data. The integrating sphere is adjusted to output 641 nm monochrome R light at 50 Nits. The R light is adjusted such that the camera center Region of Interest (ROI) of 1000*1000 pixels is disposed at an average value of 80% of the maximum range. The camera functions in a 12-bit mode, i.e., the average gray value of about 3300, and the image is collected as bright-field image data;

(c) sequentially replacing the remaining spectra of the light source, and repeating step (b) to collect the bright-field image data and dark-field image data under each spectrum, respectively. In general, dark-field image data for an optical system is common. The present invention involves the switching of light sources, and in order to eliminate potential negative effects, a separate dark-field image data measurement is performed for each light source switch in this example. In this example, the measurement procedure for each of G, B light is similar to that for R light. The integrating sphere is fixed at 50 ms exposure time. The integrating sphere is adjusted to output 520 nm monochromatic G light. Dark-field image data and bright-field image data are collected. The integrating sphere is adjusted to output 457 nm monochromatic B light. Again, dark-field image data and bright-field image data are collected; and (d) performing the flat-field correction operation on the bright-field image data and dark-field image data of each spectrum.

Calculations for spectral differentials are as follows:

AiAj spectral differential=(bright-field image data for Ai spectra—dark-field image data for Ai spectra)/(bright-field image data for Aj spectra—dark-field image data for Aj spectra) where Ai and Aj are two different spectra in spectra A1, spectra A2, spectra A3, . . . spectra AN−1 and spectra AN where i is an index ranging from 1 to N, j is an index ranging from 1 to N and N is the number of spectra.

For spectra A1, spectra A2, spectra A3, . . . spectra AN−1 and spectra AN, there are up to N*(N−1) combinations of spectral differentials as shown in FIG. 3. The results obtained from different combinations of spectra vary depending on the physical properties of the impurities, including but not limited to size, three-dimensional shape, transmittance, refractive index, etc. Therefore, traversing various combinations of spectra enriches the detection information and improves the judgment efficiency. In this example, six sets of data are obtained for the light-field and dark-field of R, G, and B spectra, respectively, through steps (a) through (c), i.e., each pixel of the camera has a corresponding six data sets independent of other pixels and these data sets exist in the form of a matrix. For each pixel P, a flat-field correction operation is performed and the data processing for each pixel is independent of each other, with no interaction between pixels. The following six differential operations are obtained.

$RG$ spectral differential=($R$ spectral bright-field image data–$R$ spectral dark-field image data)/($G$ spectral bright-field image data–$G$ spectral dark-field image data).

$GR$ spectral differential=($G$ spectral bright-field image data–$G$ spectral dark-field image data)/($R$ spectral bright-field image data–$R$ spectral dark-field image data).

$RB$ spectral differential=($R$ spectral bright-field image data–$R$ spectral dark-field image data)/($B$ spectral bright-field image data–$B$ spectral dark-field image data).

$BR$ spectral differential=($B$ spectral bright-field image data–$B$ spectral dark-field image data)/($R$ spectral bright-field image data–$R$ spectral dark-field image data).

$BG$ spectral differential=($B$ spectral bright-field image data–$B$ spectral dark-field image data)/($G$ spectral bright-field image data–$G$ spectral dark-field image data).

$GB$ spectral differential=($G$ spectral bright-field image data–$G$ spectral dark-field image data)/($B$ spectral bright-field image data–$B$ spectral dark-field image data).

The resulting matrix of spectral differentials is displayed directly in the form of an image for the determination of lens cleanliness. As can be seen from the differentials, the differential flat-field correction results are less affected by the intensity distribution of the image itself, which can suppress the effect of low relative illumination of the large-angle field of view. The same impurity appears in two locations. At a first location, a first data point appears smaller than the surrounding pixels and the image is presented as a dark spot. At a second location, a second data point appears larger than the surrounding pixels and the image is presented as a bright spot. The impurity information is extracted and enlarged in the positive and negative directions. There is a uniform pattern of distribution where two positions of the same impurity overlap one another and the edges of the overlap show a clear contrast with an edge-enhancing effect.

What is claimed herein is:

1. A method for detecting lens cleanliness of a lens disposed in a flat-field optical path, the flat-field optical path comprising a light source, the lens, a camera, the light source is a narrow-band multispectral uniform surface light source, the camera's light-sensitive surface is disposed perpendicular to an optical axis of the lens and in the light position of the lens, said method comprising:
   (a) collecting a bright-field image data and a dark-field image data in a plurality of spectra through the lens;
   (b) for each pixel of the camera, performing a spectral differential flat-field correction operation to yield a plurality of spectral differentials, wherein said plurality of spectral differentials comprise AiAj spectral differential=(bright-field image data for an Ai spectrum−dark-field image data for said Ai spectrum)/(bright-field image data for an Aj spectrum−dark-field image data for said Aj spectrum), Ai and Aj are two different spectra, i is an index ranging from 1 to N, j is an index ranging from 1 to N and N is the number of spectra; and
   (c) displaying said spectral differentials in the form of a plurality of images to show uniformity of each said image, wherein a non-uniform area on each said image is determined to have been caused by an impurity of the lens.

2. The method of claim 1, wherein said plurality of spectra comprise R, G and B.

3. The method of claim 1, wherein said narrow-band multispectral uniform surface light source comprises an RGB trichromatic narrow band uniform surface light source, wherein said plurality of images comprises six images comprising:
   (a) RG spectral differential=(R spectral bright-field image data−R spectral dark-field image data)/(G spectral bright-field image data−G spectral dark-field image data);
   (b) GR spectral differential=(G spectral bright-field image data−G spectral dark-field image data)/(R spectral bright-field image data−R spectral dark-field image data);
   (c) RB spectral differential=(R spectral bright-field image data−R spectral dark-field image data)/(B spectral bright-field image data−B spectral dark-field image data);
   (d) BR spectral differential=(B spectral bright-field image data−B spectral dark-field image data)/(R spectral bright-field image data−R spectral dark-field image data);
   (e) BG spectral differential=(B spectral bright-field image data−B spectral dark-field image data)/(G spectral bright-field image data−G spectral dark-field image data); and
   (f) GB spectral differential=(G spectral bright-field image data−G spectral dark-field image data)/(B spectral bright-field image data−B spectral dark-field image data).

4. The method of claim 1, wherein said collecting step comprises measuring the dark-field image data under each of said plurality of spectra individually and obtaining the bright-field image data and dark-field image data for each pixel under each of said plurality of spectra.

* * * * *